(12) United States Patent
Higgins et al.

(10) Patent No.: US 10,034,105 B2
(45) Date of Patent: Jul. 24, 2018

(54) ARTICLE WITH INTERNAL LIGHT SOURCE FOR FITTING IN-SITU AND RELATED DEVICES AND METHODS

(71) Applicant: Starkey Laboratories, Inc., Eden Prairie, MN (US)

(72) Inventors: Sidney A. Higgins, Maple Grove, MN (US); David Tourtelotte, Eden Prairie, MN (US); Beau Jay Polinske, Minneapolis, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 22 days.

(21) Appl. No.: 15/336,207

(22) Filed: Oct. 27, 2016

(65) Prior Publication Data
US 2017/0195807 A1 Jul. 6, 2017

Related U.S. Application Data

(60) Provisional application No. 62/274,771, filed on Jan. 4, 2016.

(51) Int. Cl.
*H04R 25/00* (2006.01)
*H04R 1/10* (2006.01)
*B29C 35/08* (2006.01)

(52) U.S. Cl.
CPC ......... *H04R 25/652* (2013.01); *H04R 1/1058* (2013.01); *B29C 35/0805* (2013.01); *B29C 2035/0827* (2013.01); *H04R 25/658* (2013.01); *H04R 2225/023* (2013.01); *H04R 2460/17* (2013.01)

(58) Field of Classification Search
CPC combination set(s) only.
See application file for complete search history.

(56) References Cited

U.S. PATENT DOCUMENTS

| | | |
|---|---|---|
| 5,045,266 A | 9/1991 | Moro et al. |
| 5,066,011 A | 11/1991 | Dykstra et al. |
| 5,321,757 A | 6/1994 | Woodfill, Jr. |
| 5,333,622 A | 8/1994 | Casali et al. |
| 6,473,512 B1 | 10/2002 | Juneau et al. |
| 8,885,860 B2* | 11/2014 | Djalilian ................. H04R 5/00 181/128 |
| 2006/0188119 A1* | 8/2006 | Parker ................. H04R 25/608 381/322 |

OTHER PUBLICATIONS

"Revols—Premium Quick Custom-Fit Wireless Earphones," Retrieved Oct. 25, 2016, from https://www.kickstarter.com/projects/revols/revols-premium-quick-custom-fit-wireless-earphones, 1-32.

\* cited by examiner

*Primary Examiner* — Amir Etesam
(74) *Attorney, Agent, or Firm* — Mueting, Raasch & Gebhardt, P.A.

(57) ABSTRACT

Articles and related devices and methods for fitting in-situ include a flexible sleeve, a housing assembly fixed to the flexible sleeve, a light source disposed within the flexible sleeve, and a photocurable resin contained within the flexible sleeve. The flexible sleeve may be elastomeric. A transducer may be disposed in the housing assembly.

20 Claims, 9 Drawing Sheets

ARTICLE WITH INTERNAL LIGHT SOURCE FOR FITTING IN-SITU AND RELATED DEVICES AND METHODS

CROSS REFERENCE TO RELATED APPLICATIONS

This application claims the benefit of provisional application U.S. Prov. App. Ser. No. 62/274,771, filed Jan. 4, 2016, entitled SELF-FITTING IN-CANAL COMPONENT AND HEARING ASSISTANCE DEVICES USING SAME, which is incorporated herein for all purposes.

TECHNICAL FIELD

The present disclosure relates to an article for fitting in-situ. In particular, the present disclosure relates to an article having an internal light source for curing a resin in-situ for fitting to an ear canal and is attached to a hearing device.

BACKGROUND

Hearing assistance devices include a variety of ear-level devices that assist or aid hearing of a wearer. Such apparatus may be worn partially or fully on the ear and/or in the ear. In the example of apparatus worn at least partially in the ear, the device must either employ a standard fit component that typically comes in a predetermined range of suitable sizes or it must be custom fit to the ear canal of the wearer. Devices requiring an accurate and close fit are typically custom fitted to the wearer's ear or ear canal. Such devices include completely-in-the canal (CIC) hearing aids, which are shaped to fit a particular wearer's ear canal. However, there are a number of devices that may benefit from custom fitting to match the geometry of the ear canal other than CIC hearing aids.

One disadvantage of making custom fitted devices is the use of reverse casting technique, in which an ear impression or earmold of a wearer is sent to a manufacturer and processed to construct the custom-fitted housing of the device. For example, the ear impressions must be made, sent to a facility, and processed at the manufacturer to create the custom fitted piece. This can add delays and require repeated office visits which are also time consuming and costly. It can also require one or more specially trained professionals, further increasing the cost.

SUMMARY

In general, the present disclosure provides an article including a flexible sleeve, a light source disposed within the flexible sleeve, and a resin contained within the flexible sleeve. The article can be placed into an ear canal and cured to provide a custom fit.

In one aspect, the present disclosure provides an article including a flexible sleeve. The article also includes a housing assembly fixed to the flexible sleeve. A distal portion of the housing assembly is surrounded by the flexible sleeve. The article also includes a light source disposed within the flexible sleeve. The article also includes a photocurable resin contained within the flexible sleeve.

In another aspect, the present disclosure provides an article including a flexible sleeve. The article also includes a housing assembly fixed to the flexible sleeve. A distal portion of the housing assembly is surrounded by the flexible sleeve. The article also includes a light source disposed within the flexible sleeve. The article also includes a cured resin contained within the flexible sleeve. The article also includes a transducer disposed in the distal portion of the housing assembly.

In another aspect, the present disclosure provides a method including inserting an article into an ear canal. The article has a photocurable resin contained within a flexible sleeve conformable to the ear canal upon insertion. The method also includes activating a light source disposed within the flexible sleeve to cure the photocurable resin while inserted in the ear canal to form a cured resin defining a cured shape that conforms to the ear canal.

It is to be understood that both the foregoing general description and the following detailed description present embodiments of the subject matter of the present disclosure, and are intended to provide an overview or framework for understanding the nature and character of the subject matter of the present disclosure as it is claimed.

BRIEF DESCRIPTION OF THE DRAWINGS

The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

Figure 1:
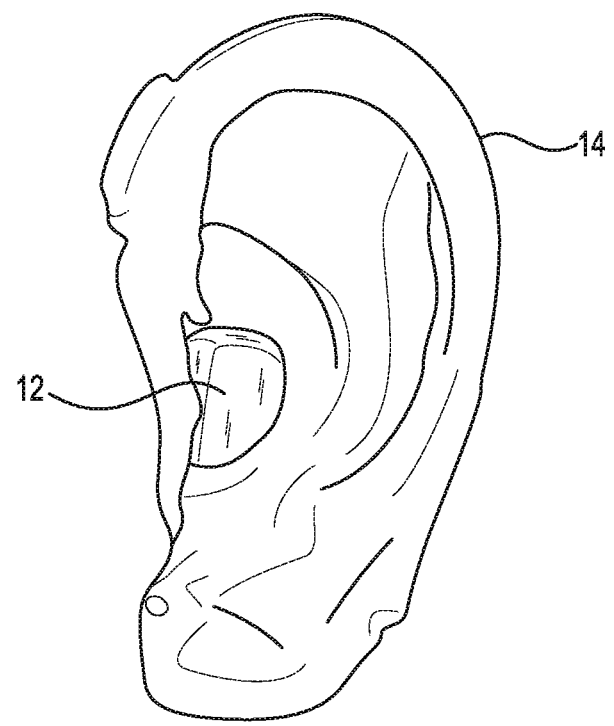
FIG. 1 is a perspective view of a hearing device in use with an ear.

The disclosure may be more completely understood in consideration of the following detailed description of various embodiments of the disclosure in connection with the accompanying drawings.

DETAILED DESCRIPTION

In the following detailed description, reference is made to several specific embodiments. It is to be understood that other embodiments are contemplated and may be made without departing from the scope or spirit of the present disclosure. The following detailed description, therefore, is not to be taken in a limiting sense.

It would be beneficial to provide a custom fitted in-ear canal device for hearing assistance devices that can be rapidly fitted with or without the help of a practitioner who may have technical expertise in fitting ear canal devices. It would also be beneficial for to provide a self-contained device that can provide a comfortable and custom fit. It would also be beneficial to provide a custom fit device that does not require making an impression, an off-site visit, or remote manufacturing. It would also be beneficial to provide an in-ear canal device that reduces pressure on the ear canal when being fitted.

The present disclosure describes an article including a flexible sleeve, a light source disposed within the flexible sleeve, and a resin contained within the flexible sleeve. The resin can be photocurable in-situ upon being placed in an ear canal by the light source. The light source may be connected to a device external to the flexible sleeve, such as a hearing device, a hearable, or a power source. The article may include a housing assembly fixed to the flexible sleeve. The housing assembly may elongate to further improve fit and comfort during fitting. After fitting, a transducer disposed within the housing assembly may be used to direct sound into the ear canal through an acoustic port, and the light source may be used as an indicator. A wax bridge may be provided to mitigate occlusion of the acoustic port.

The present subject matter is demonstrated for wearable devices, which may be portable, such as hearing devices. Hearing devices may include hearing assistance devices, or hearing aids of various types, such as behind-the-ear (BTE), in-the-ear (ITE), in-the-canal (ITC), receiver-in-canal (RIC), or completely-in-the-canal (CIC) type hearing aids. It is understood that BTE type hearing aids may include devices that reside substantially behind the ear or over the ear. Such devices may include hearing aids with receivers associated with the electronics portion of the device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard, open fitted, or occlusive fitted. The present subject matter may additionally be used in consumer electronic wearable audio devices having various functionalities. It is understood that other devices not expressly stated herein may also be used in conjunction with the present subject matter.

The article can be used with a variety of hearing assistance device types. Hearing assistance devices typically include at least one enclosure or housing, a microphone, hearing assistance device electronics including processing electronics, and a speaker or "receiver." Hearing assistance devices may include a power source, such as a battery. In various embodiments, the battery may be rechargeable. In various embodiments multiple energy sources may be employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing aids include a processor. In digital hearing aids with a processor, programmable gains may be employed to adjust the hearing aid output to a wearer's particular hearing impairment. The processor may be a digital signal processor (DSP), microprocessor, microcontroller, other digital logic, or combinations thereof. The processing may be done by a single processor, or may be distributed over different devices. The processing of signals referenced in this application can be performed using the processor or over different devices.

Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing.

In various embodiments the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments, different realizations of the block diagrams, circuits, and processes set forth herein can be created by one of skill in the art without departing from the scope of the present subject matter.

Although the present disclosure describes the article for use in relation to hearing assistance devices in the ear canal, the article may be used in various applications related to the ear, other human anatomy, or fitting to any other article having a cavity. For example, the article may be used for custom fitting: ear canal impressions (e.g., for use in making another custom fit device), hearable devices (e.g., earbuds, Bluetooth headsets, or back-vented vented tweeter-woofer devices), ear plugs (e.g., for swimming and hunting), or health monitors (e.g., step counter or heartrate monitor).

Reference will now be made to the drawings, which depict one or more aspects described in this disclosure. However, it will be understood that other aspects not depicted in the drawings fall within the scope and spirit of this disclosure. Like numbers used in the figures refer to like components, steps and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar.

Referring now to FIGS. 1-5, an article 10 can be attached to a hearing device 12 for use with an ear 14 of a wearer. The article 10 may be custom fitted to the ear canal of the wearer. In some embodiments, the article 10 includes a flexible sleeve 16, a housing assembly 20, a light source 26, and a resin 28. In general, the article 10 may be formed as an enclosed dome or bud.

The flexible sleeve 16 may form, at least partially, an exterior surface 18 of the article 10 that can interface with the ear 14, for example, in the ear canal. In some embodiments, the shape of the flexible sleeve 16 before fitting may be substantially spherical, ellipsoidal, or ovate.

The flexible sleeve 16 may be elastomeric. The flexible sleeve 16 may feel soft to the touch. The flexible sleeve 16 may be formed of any suitable compliant membrane material. For example, the flexible sleeve 16 may be formed of any suitable natural rubber, synthetic rubber, or combinations thereof (e.g., latex). In some embodiments, the flexible sleeve 16 is formed of silicone. In some embodiments, the flexible sleeve 16 is formed of a thermoplastic elastomer (TPE) or a thermoplastic urethane (TPU).

The thickness of the flexible sleeve 16 may be selected, for example, based on the material used and the desired properties for the flexible sleeve 16. In some embodiments, the thickness is greater than or equal to about 5 mils (or 0.005 inches). In some embodiments, the thickness is equal to about 5 mils, and the material is a high tear strength rubber. In some embodiments, the thickness is less than or equal to about 60 mils. A greater thickness may mitigate undesirable wrinkling of the flexible sleeve 16. In some embodiments, the thickness is in a range from about 5 mils to about 60 mils, about 10 mils to about 30 mils, or about 15 mils to about 25 mils. In some embodiments, the thickness is about 20 mils.

The flexible sleeve 16 may be transparent, semi-transparent, or translucent to at least some wavelengths in the electromagnetic spectrum, such as ultraviolet light (UV), visible light, infrared light (IR), or combinations thereof. In some embodiments, a glow or pulse of light may emanate from the article 10 when the hearing device 12 is worn through the flexible sleeve 16. In some embodiments, the transparent flexible sleeve 16 may reduce the visual impact of the article 10 (e.g., be more invisible or less noticeable) to improve the desirability to be worn.

The flexible sleeve 16 may be internally reflective to at least some wavelengths in the electromagnetic spectrum, such as UV light, visible light, IR light, or combinations thereof. In some embodiments, light emanating within the article 10 is reflected internally by the flexible sleeve 16 (e.g., for improved curing).

The housing assembly 20 may be fixed to the flexible sleeve 16. In some embodiments, the flexible sleeve 16 is bonded to the housing assembly 20 with an adhesive (e.g., a glue). In some embodiments, a primer is applied to the flexible sleeve 16 before applying the adhesive. The housing assembly 20 may be formed of a rigid material. In some embodiments, the housing assembly 20 is formed of a plastic, metal, or both.

The housing assembly 20 can include a distal portion 22 and a proximal portion 24. In some embodiments, the distal portion 22 is surrounded by the flexible sleeve 16. In some embodiments, the distal portion 22 is a receiver. In some embodiments, the proximal portion 24 is a slip housing. The proximal portion 24 may form, at least partially, the exterior surface 18 of the article 10.

The distal portion 22 may be formed of the same material or a different material than the proximal portion 24. For example, in some embodiments, the distal portion 22 is formed of a metal and the proximal portion 24 is formed of a polymeric material.

The light source 26 may be disposed within the flexible sleeve 16. The light source 26 may provide electromagnetic radiation across a spectrum of frequencies. In some embodiments, the light source 26 provides ultraviolet light, visible light, or both. In some embodiments, the light source 26 provides visible light with a color blue or violet color.

In some embodiments, the light source 26 is used for curing and fitting. In some embodiments, the light source 26 is used as a visual indicator after curing and fitting.

The light source 26 may be active or passive. In some embodiments, the light source 26 is active and includes a solid-state device (e.g., a light-emitting diode, or LED). In some embodiments, the light source 26 is a surface mount LED connected to a flex circuit. In some embodiments, the light source 26 is passive and includes a light pipe element (e.g., optical fiber).

The light source 26 may include one or more devices or elements. In some embodiments, the light source 26 includes two or more devices or elements. In some embodiments, the light source 26 includes four devices or elements.

The devices or elements of the light source 26 may be evenly spaced around the housing assembly. In some embodiments, the devices or elements are spaced at 90 degree angles around the housing assembly 20.

A person having skill in the art and the benefit of the present disclosure would understand the configuration of the light source 26 may vary depending on the requirements of the particular application (e.g., cure time, exothermal temperature rise during cure, power constraints, internal geometry, etc.).

The resin 28 may be uncured (e.g., photocurable) and disposed within the flexible sleeve 16. Before curing, the resin 28 may be in liquid form (e.g., flowable) and substantially conform to the shape of the flexible sleeve 16. In some embodiments, the resin 28 may fill the flexible sleeve 16 and be substantially free of air bubbles. In some embodiments, the resin 28 is a photopolymer, which can be solidified by curing with light or electromagnetic radiation (e.g., ultraviolet light) to form a polymer. Once cured, the solidified resin 28 may be rigid.

The cure of the resin 28 may be accelerated by exposure to the light source 26. The resin 28 may cure in response to one or more of ultraviolet light exposure, visible light exposure, and temperature exposure (e.g., room temperature or human body temperature). In some embodiments, the resin 28 cures in response to ultraviolet light exposure at a faster rate than visible light exposure, temperature exposure, or both. In some embodiments, the resin 28 cures in response to visible light exposure at a faster rate than temperature exposure.

The resin 28 may have a viscosity selected to facilitate the ease of filling the flexible sleeve 16 (e.g., a lower viscosity), the reduction of potentially problem-causing air bubbles (e.g., a lower viscosity), the proper depth of cure (e.g., sometimes a higher viscosity), or combinations thereof. In some embodiments, the viscosity of the resin 28 before curing is greater than about 10 millipascal-seconds (or centipoise), greater than or equal to about 100 millipascal-seconds, about 500 millipascal-seconds, or about 800 millipascal-seconds. In some embodiments, the viscosity of the resin 28 before curing is less than or equal to about 10,000 millipascal-seconds, about 5,000 millipascal-seconds, about 2500 millipascal-seconds, or about 1500 millipascal-seconds. In some embodiments, the viscosity of the resin 28 is in a range from about 10 to about 10000 millipascal-seconds, or from about 100 to about 5000 millipascal-seconds, or from about 500 to about 2500 millipascal-seconds. In some embodiments, the viscosity of the resin 28 is about 1500 millipascal-seconds.

The resin 28 may be electrically insulative before curing, after curing, or both. In some embodiments, conductive portions of the light source 26 (e.g., flex circuit) may be in direct contact with the electrically insulative resin 28.

Any suitable photopolymer for the resin 28 may be used, which may include a photoinitiator, a monomer, an oligomer, or combinations thereof. Non-limiting examples of photoinitiators include ionic photoinitiators (e.g., cationic photoinitiators such as onium salts, organometallics, or pyridinium salts) and free radical photoinitiators (e.g., abstraction types, such as benzophenone, xanthones, or quinones, or cleavage types, such as benzoin ethers, acetophenones, benzoyl oximes, and acylphosphines). Non-limiting examples of monomers include styrene, N-Vinylpyrrolidone, and acrylates. Non-limiting examples of oligomers include epoxides, urethanes, polyethers, or polyesters.

In some embodiments, the resin 28 includes an ethoxylated bisphenol A dimethacrylate, which may be a primary component. In some embodiments, the resin 28 also includes an acrylated urethane resin as a secondary component. In some embodiments, the resin 28 is a Dreve Fotoplast S hard resin manufactured by Dreve (Unna, Germany), which may be cured in response to at least ultraviolet light.

When the article 10 is inserted into the ear canal of the ear 14, the flexible sleeve 16 and the photocurable resin 28 contained therein (e.g., in liquid form) may substantially conform to the shape of the ear canal. The article 10 may be cured to conform to one or more portions of the ear canal geometry. In some embodiments, the article 10 fits to a portion of the canal length and to a portion of the diameter of the canal. This allows configurations of article 10 to be conformed to, for example, bends or other anatomically complex geometries.

The resin 28 may be cured, or curing may at least be accelerated, by the light source 26 while the article 10 is in the ear canal for fitting of the article to the wearer. In some embodiments, the in-situ fitting process may achieve a fit that accounts for the weight and shape of the hearing device 12 in its use position to facilitate comfort and a secure fit.

After curing, the cured resin 28 may remain contained within the flexible sleeve 16. The resin 28 may conform to the shape of the ear canal in the ear 14. The light source 26 may remain within the flexible sleeve 16 and the cured resin 28.

The cured form of the resin 28 may be harder than the uncured form. The cured resin 28 may be harder than the flexible sleeve 16. In other words, the flexible sleeve 16 may be softer than the cured resin 28. In some embodiments, the hardness of the cured resin 28 is greater than or equal to about 40 Shore durometer (Type A). In some embodiments, the hardness of the cured resin 28 is about 80 Shore durometer (Type D). In some embodiments, the hardness of the cured resin 28 is greater than 80 Shore durometer (Type D).

The resin 28 may not adhere to the flexible sleeve 16. In some embodiments, the flexible sleeve 16 can slide along the cured resin 28 to provide a comfortable fit for the wearer by adapting to changes in the shape of the ear canal, which may be due to jaw movement, humidity, and the health of the wearer, and may mitigate potential irritation of the ear canal due to the cured resin 28 (e.g., a rigid polymer). In some embodiments, slight slippage between the flexible sleeve 16 and cured resin 28 may soften sharp and rigid transitions developed in the cured form of the resin 28. In some embodiments, slippage may eliminate a shear condition between the flexible sleeve 16 and the rigid cured resin 28 that could endanger service life of the article 10. In some embodiments, slippage may mitigate undesirable effects of acoustic slit leaks.

The light source 26 may be at least partially disposed within the resin 28, before or after curing. In some embodiments, the resin 28, before or after curing, is transparent to ultraviolet light, visible light, or both.

The light source 26 may be disposed on the housing assembly 20. In some embodiments, the light source 26 is disposed on the proximal portion 24 of the housing assembly 20.

The article 10 or hearing device 12 may include additional sensors (not shown). Such sensors include, but are not limited to, magnetic field sensors, telecoils, temperature sensors, accelerometers, light sensors (e.g., visible or other wavelengths), and proximity sensors. For example, an article 10 used with a step counter may include an accelerometer.

Various components contained within the flexible sleeve 16 may move around when the resin 28 is uncured. For example, the housing assembly 20 may be configured to elongate along a longitudinal axis 30 in response to a transversely directed force on the flexible sleeve 16. In some embodiments, the linear expansion of the housing assembly 20 can redirect constriction pressure in the transverse direction toward extending the flexible sleeve 16 and the housing assembly 20. In some embodiments, the distal portion 22 and proximal portion 24 of the housing assembly 20 are positioned to intersect the longitudinal axis 30.

The distal portion 22 of the housing assembly 20 may be movable along the longitudinal axis 30 relative to the proximal portion 24 before curing the resin 28. In some embodiments, the distal portion 22 may move freely as permitted by the viscosity and hydraulic action of the uncured resin 28. The movement of the distal portion 22 relative to the proximal portion 24 may be described as linear, piston-like, or sliding. In some embodiments, the distal portion 22 is fixed relative to the proximal portion 24 after curing the resin 28.

The article 10 may define a substantially constant internal volume, which may facilitate the hydraulic action of the housing assembly 20. In some embodiments, the hydraulic action allows the flexible sleeve 16 to conform to the ear canal and extends the article 10 deeper into the ear canal a sufficient distance to removably secure the article 10 within the ear canal. Increased pressure about the flexible sleeve 16 may increase the length of the article 10.

In some embodiments, the length article 10 of the article may increase up to about 10%, 20%, 25%, 30%, or 33% of the shortest length (e.g., nominal length). The increase in length may be the same or similar for the housing assembly 20, which may facilitate or control the increase in the length of the article 10. In some embodiments, the overall size of the article 10 (e.g., represented by volume of the resin 28 within the flexible sleeve 16) is proportional to the length. For example, a larger article 10 may correspond to a larger increase in length.

The distal portion 22 of the housing assembly 20 may be fixed to a distal end portion 32 of the flexible sleeve 16. In some embodiments, the distal portion 22 of the housing assembly 20 defines a spout 23 fixed to the distal end portion 32 of the flexible sleeve 16.

The proximal portion 24 of the housing assembly 20 may be fixed to a proximal end portion 34 of the flexible sleeve 16. The proximal portion 24 may extend through an opening 36 in the proximal end portion 34 of the flexible sleeve 16.

The housing assembly 20 may define a cavity 38 between the distal portion 22 and the proximal portion 24 of the housing assembly when the housing assembly is elongated along the longitudinal axis 30. In some embodiments, the cavity 38 is defined in the proximal portion 24 of the housing assembly 20. As the housing assembly 20 is elongated, the cavity 38 may expand in volume. In some embodiments, the cavity 38 may expand in volume while the interior volume defined by the flexible sleeve 16 remains fixed (e.g., constant).

The cavity 38 may be in fluid communication with the photocurable resin 28 contained within the flexible sleeve 16. In some embodiments, the resin 28 can flow into the cavity 38 when the housing assembly 20 is elongated. In some embodiments, the cavity 38 is included instead of an overflow reservoir for receiving the photocurable resin 28.

Figure 3:
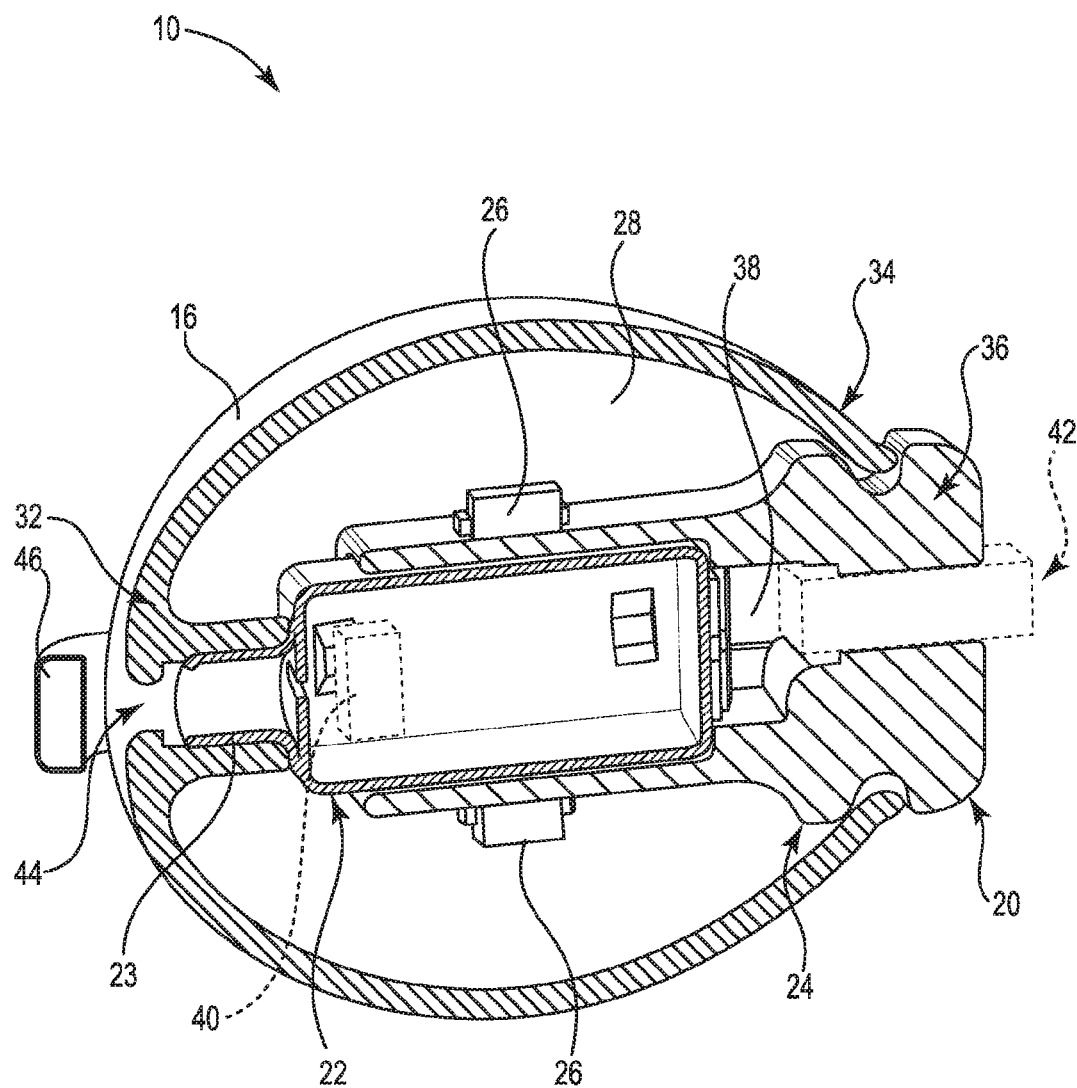
FIG. 3 is a cutaway perspective view of the article of FIG. 2 along line 3-3.
Figure 4:
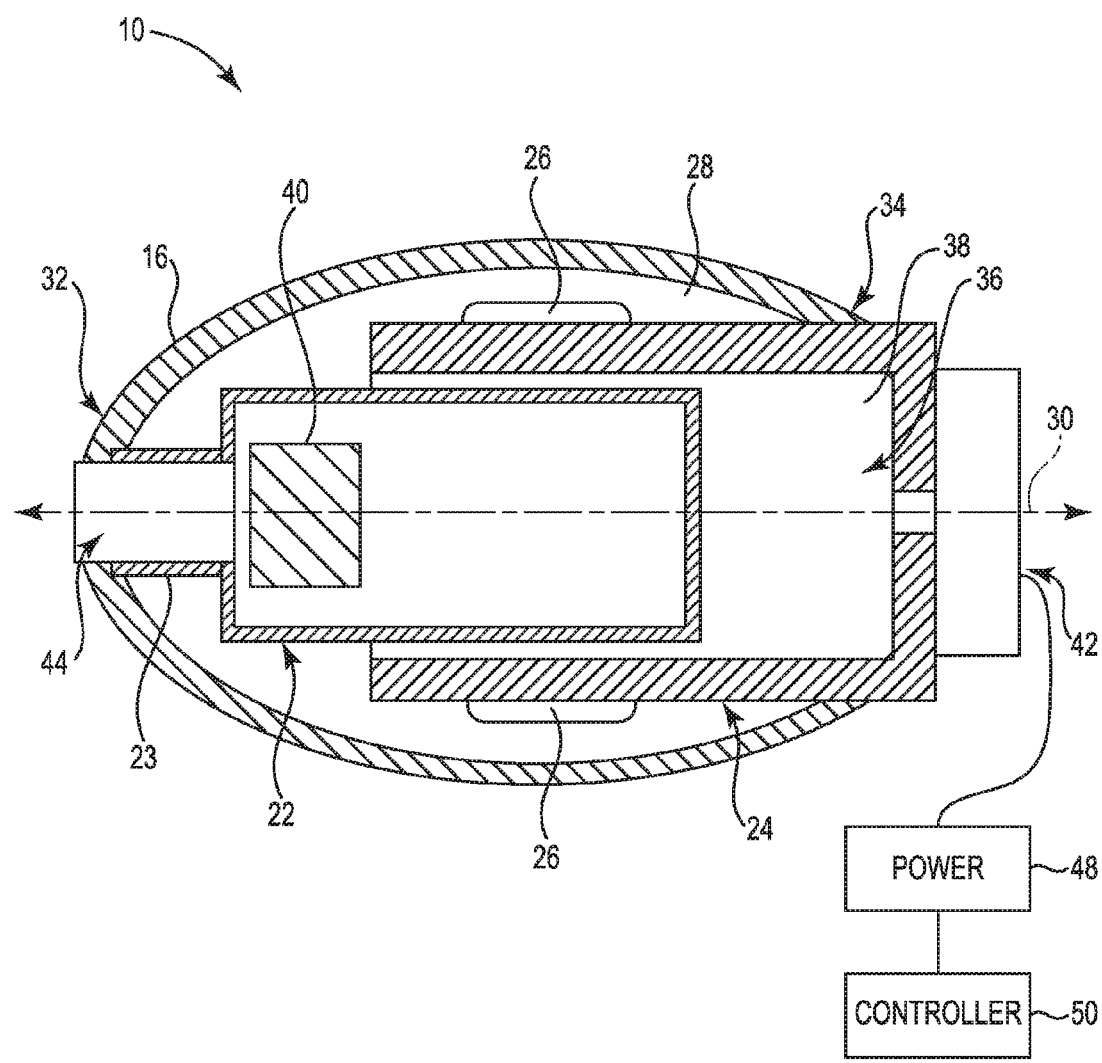
FIG. 4 is a cutaway side view of a schematic illustration of the article of FIG. 3.
Figure 5:
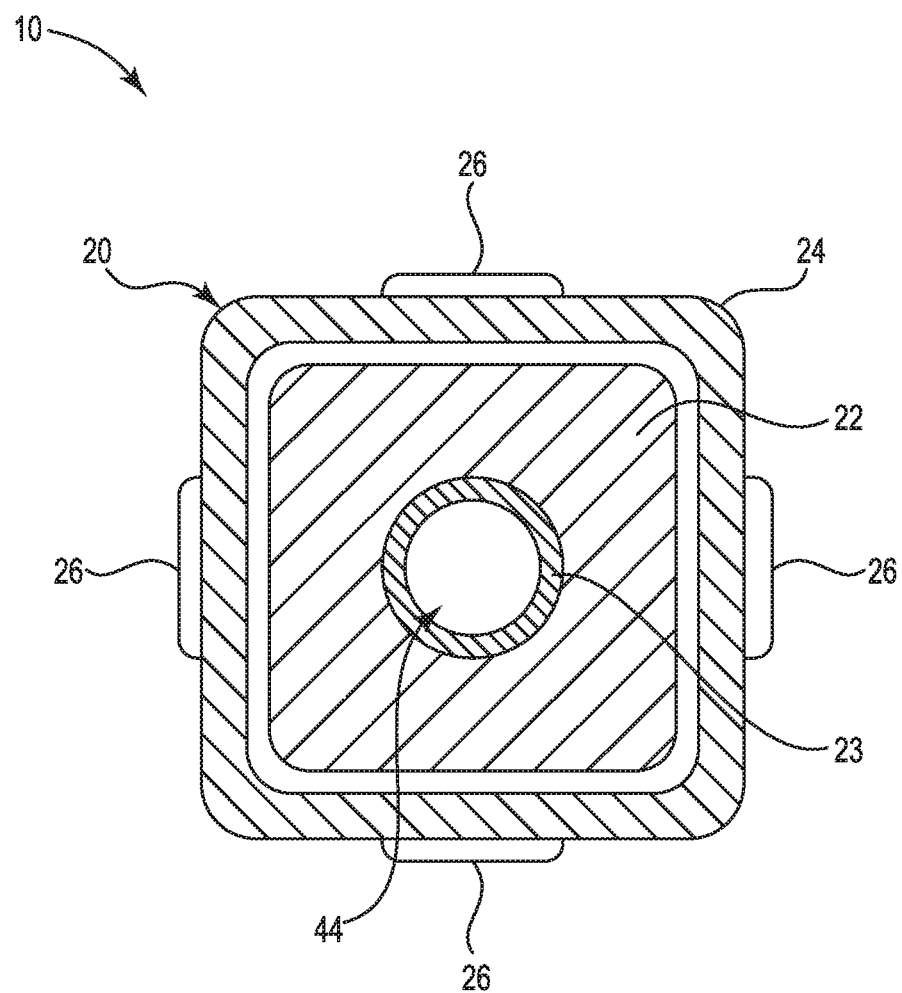
FIG. 5 is a distal-end view of a schematic illustration of the housing assembly and light sources of the article of FIG. 4.

The article 10 may include a transducer 40 disposed within the distal portion 22 of the housing assembly 20. As illustrated in FIGS. 3-4, the transducer 40 is shown schematically as a rectangular prism or rectangle for illustrative purposes but may take any suitable shape. In some embodiments, the transducer 40 can deliver sound or be controlled by hearing assistance devices, packet-based devices, streaming audio devices, Wi-Fi devices, or remote control devices.

A connector 42 may be electrically connected to the light source 26, the transducer 40, or both via the cavity 38. As illustrated in FIGS. 3-4, the connector 42 is shown schematically as a rectangular prism or rectangle for illustrative purposes but may take any suitable shape. In some embodiments, the connector 42 is connected to a flex circuit of the light source 26 to activate for curing (e.g., through the housing assembly 20). In some embodiments, the connector 42 is connected to the transducer 40 through the cavity 38 via a service loop of conductive wires.

An acoustic port 44 may provide a space to transmit sound from the transducer 40 out of the article 10, for example, through air. For example, the transducer 40 can be directed toward the acoustic port 44. In some embodiments, the acoustic port 44 is defined at least partially by the spout 23 of the distal portion 22 of the housing assembly 20. In some embodiments, the acoustic port 44 is defined at least partially by the distal end portion 22 of the flexible sleeve 16.

Transversely directed forces on the article 10 may elongate the housing assembly 20 instead of collapsing the acoustic port 44. In some embodiments, the bond of the flexible sleeve 16 to the metal spout 23 may help to prevent collapsing of the acoustic port 44.

A wax bridge 46 may be positioned to provide a partial cover over the acoustic port 44, which may help to prevent obstructions (e.g., ear wax) from occluding the acoustic port 44. In some embodiments, the acoustic port 44 may at least partially extend between the transducer 40 and the wax bridge 46.

The wax bridge 46 may have a generally arcuate shape. In some embodiments, the wax bridge 46 is a semi-circle shape.

The wax bridge 46 may extend longitudinally away from the distal end portion 32 of the flexible sleeve 16. In some embodiments, the wax bridge 46 is fixed to the distal end portion 32.

The volume of space defined within the wax bridge 46 may vary depending on the size of the article 10. In some embodiments, the wax bridge 46 defines a volume between about 260 mm³ and about 660 mm³. In some embodiments, the wax bridge 46 defines a volume between about 460 mm³ and about 660 mm³, which may be suitable for a larger ear canal. In some embodiments, the wax bridge 46 defines a volume of about 560 mm³. In some embodiments, the wax bridge 46 defines a volume between about 260 mm³ and about 460 mm³, which may be suitable for a smaller ear canal. In some embodiments, the wax bridge 46 defines a volume of about 360 mm³.

A power source 48 may be releasably connected to the proximal portion 24 of the housing assembly 20. The power source 48 may be electrically connected to at least one of the transducer 40 and the light source 26. In some embodiments, the power source 48 delivers current when activated greater than or equal to about 1 milliamps, about 2 milliamps, or about 5 milliamps. In some embodiments, the power source 48 delivers current when activated less than or equal to about 100 milliamps, about 50 milliamps, or about 20 milliamps.

The power source 48 may be connected to a controller 50. The controller 50 may be used to selectively deliver power from the power source 48 to the light source 26. The controller may be connected by wire or wirelessly to the light source 26. In some embodiments, the controller 50 is a smartphone wirelessly connected via Bluetooth to the power source 48. In some embodiments, the controller 50 is used to control the light source 26 after curing, for example, to use the light source 26 as a visual indicator.

Figure 2:
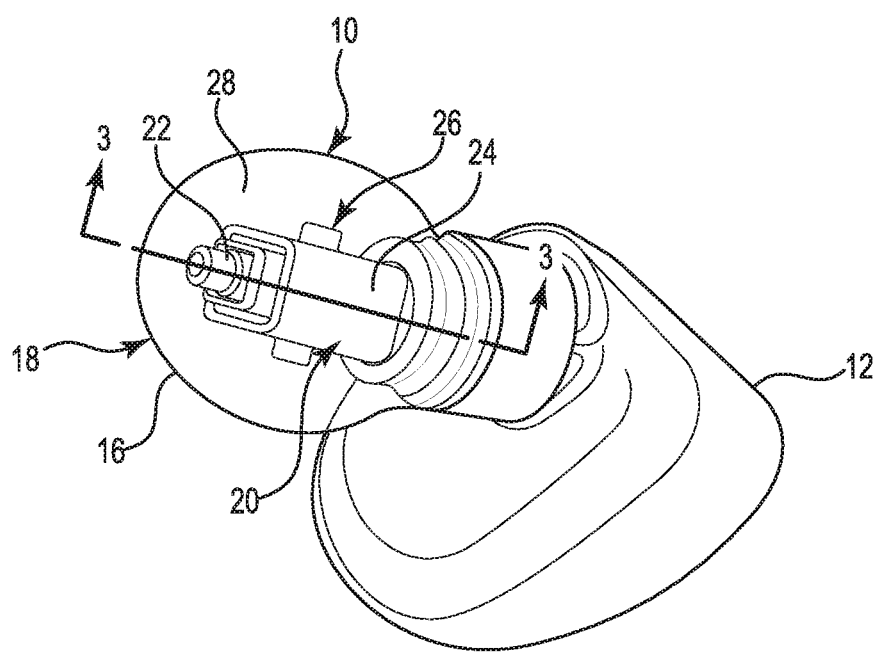
FIG. 2 is a perspective view of an article attached to the hearing device of FIG. 1.
Figure 6:
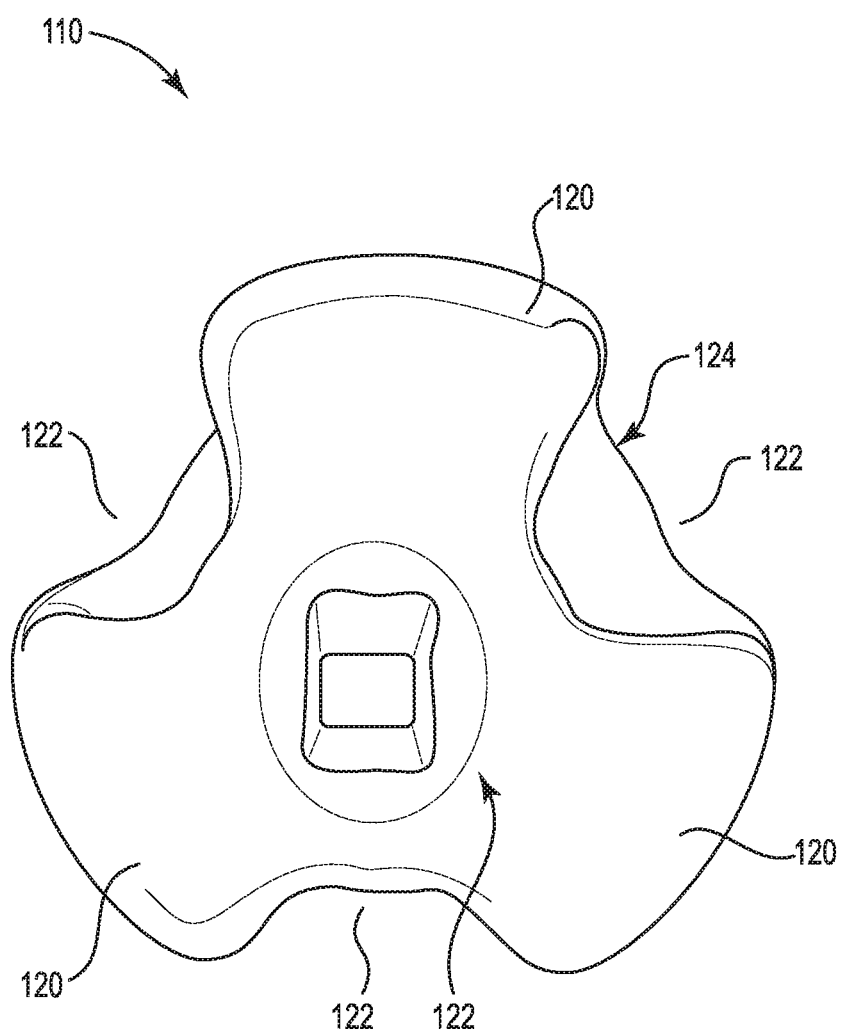
FIG. 6 is an end perspective view of an article with an alternative shape for use with the hearing device of FIG. 1.

FIG. 6 shows an article 110, which is similar to article 10 (FIG. 2), but article 110 has a flexible sleeve 116 with a different shape than flexible sleeve 16 (FIG. 2). As shown for illustrative purposes in FIG. 6, which is an end view with slight perspective, a distal end portion 122 of the article 110 is generally extending toward a viewer of FIG. 6 and a proximal end portion 124 of the article is extending generally away from the viewer.

The flexible sleeve 116 may define two or more lobes 120 and one or more air channels 122 between the lobes exterior to the flexible sleeve. In some embodiments, the article 110 has a tri-lobe design, which may naturally fit the wide bottom oval shape of the human ear canal.

The article 110 may provide an open fit, which can prevent occluding of the ear canal and allows for some level of natural hearing through the article 110. In some embodiments, the article 110 may also provide improved comfort compared to article 10.

In some embodiments, the article 110 includes portions that conform to the shape of the ear canal (e.g., lobes 120) and portions that do not conform to the shape of the ear canal (e.g., resulting in air channels 112). The air channels 122 may extend between the proximal end portion 124 and the distal end portion 126 of the flexible sleeve 116.

Figure 7:
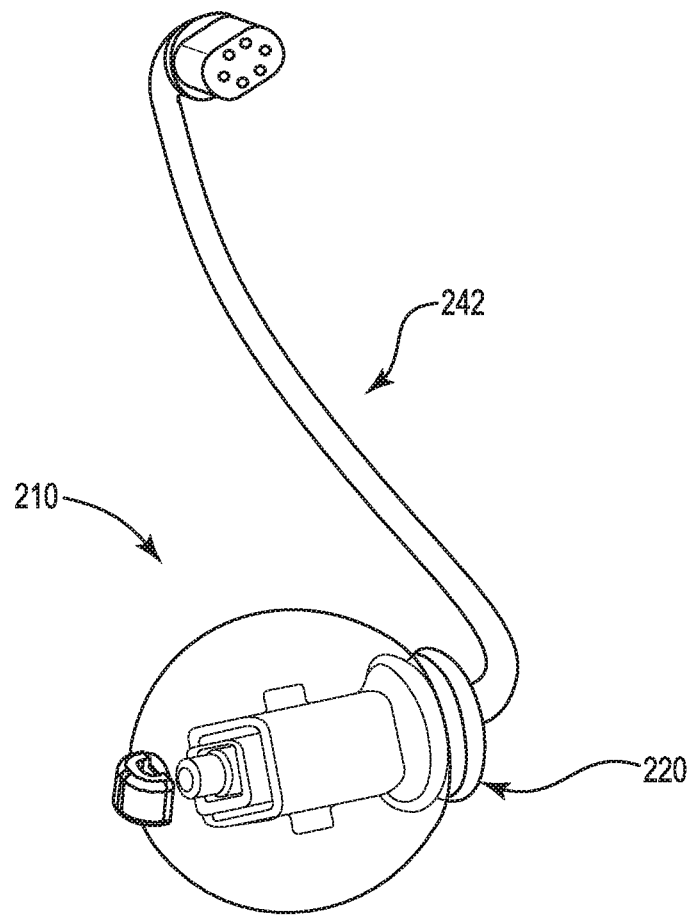
FIG. 7 is a perspective view of an article with a tail-type connector for use with the hearing device of FIG. 1.

FIG. 7 is a perspective view of an article 210 and a connector 242. The article 210 may be similar to article 10 (FIG. 3) and the connector 242 may be a tail-type connector with a similar conductor configuration as connector 42 (FIG. 3). The tail-type connector 242 may include at least one flexible wire extending from a housing assembly 220, which may allow the article 210 to connect to various devices and power sources. In some embodiments, the tail-type connector 242 may facilitate a connection to a BTE hearing device when the article 210 is inserted into the ear canal.

Figure 8:
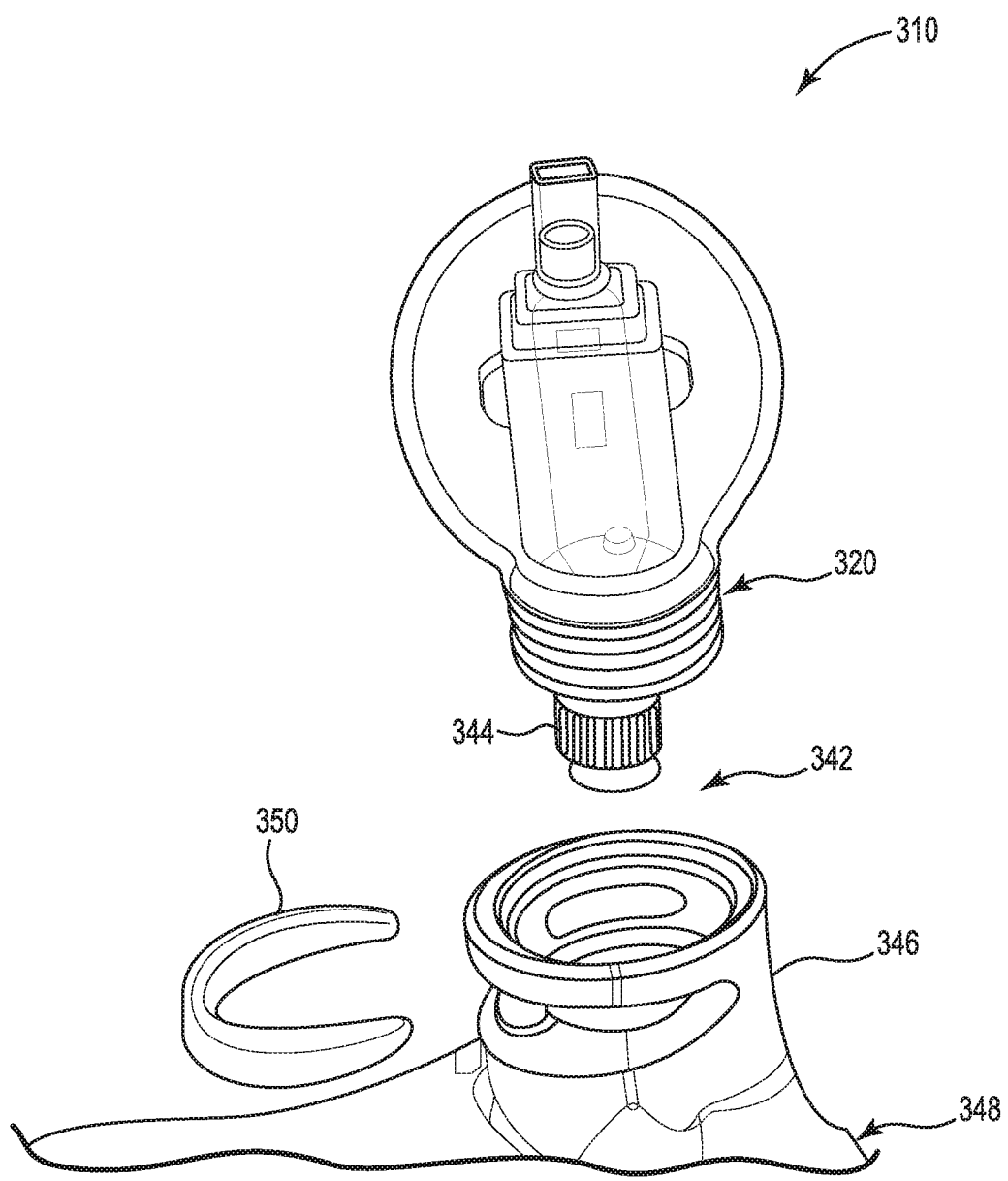
FIG. 8 is a perspective view of an article with a clip-type connector for use with the hearing device of FIG. 1.

FIG. 8 is a perspective view of an article 310, which is similar to article 10 (FIG. 7), but article 310 has a clip-type connector 342 instead of a tail-type connector 242 (FIG. 7). The article 310 can be modularly connected to various devices and power sources. In some embodiments, the clip-type connector 342 may facilitate a connection to an RIC hearing device when the article 310 is inserted into the ear canal.

The clip-type connector 342 may not include flexible wires extending from a housing assembly 320. Rather, the clip-type connector 242 may include a trunk 344 (e.g., plug-in interface) that can be inserted into a receptacle 346 of a hearing device 348. A collar 350 may be attached to the housing assembly 320 when the trunk 344 is inserted into the receptacle 346 to fix the article 310 to the hearing device 348. The collar 350 may be removable to allow the article 310 attach to a different device or power source than hearing device 348.

Figure 9:
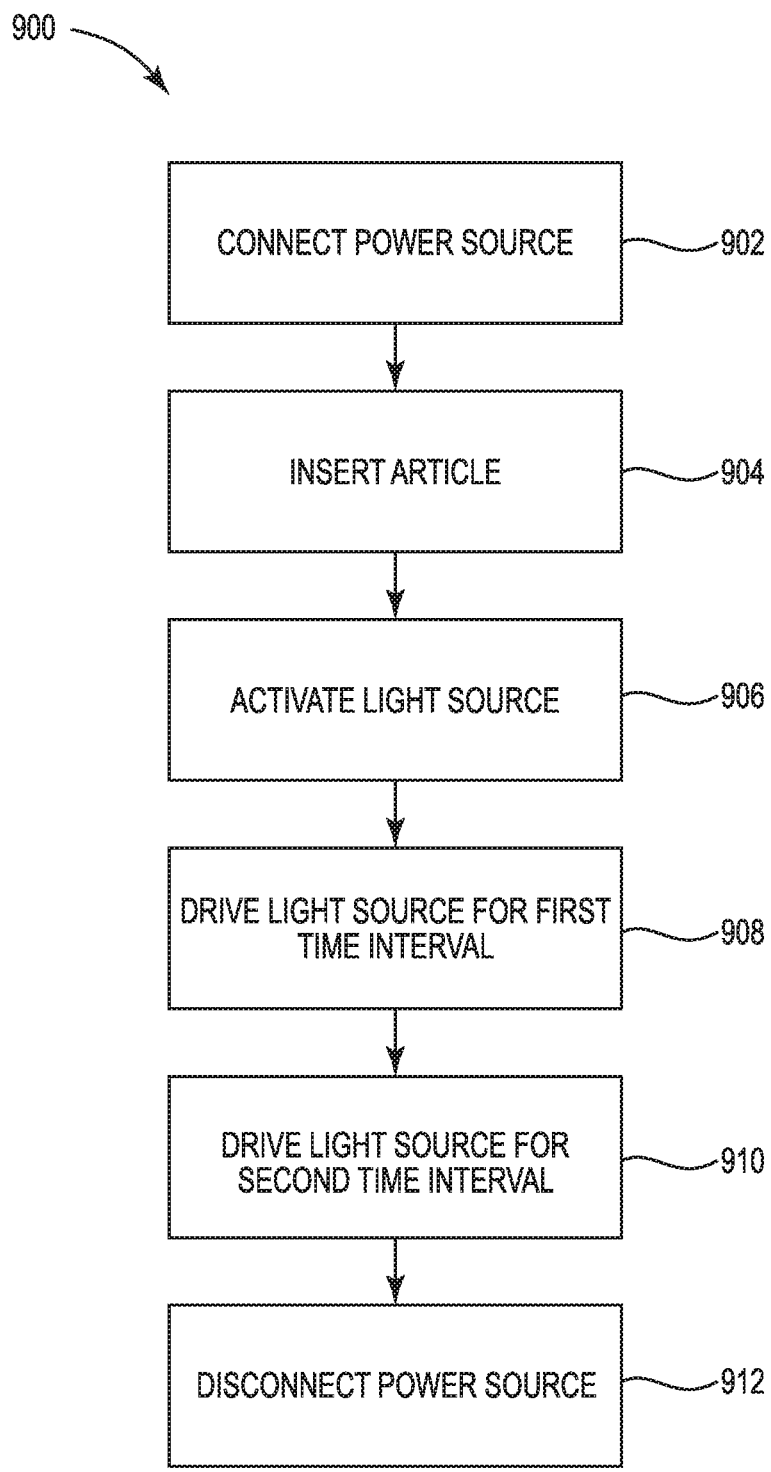
FIG. 9 is a schematic illustration of a method of using the article of FIG. 2.

FIG. 9 is a schematic illustration of a method 900 of using the article of FIG. 2. The method 900 may begin with optional step 902, in which an article is connected with a power source. The power source may be external. In some embodiments, the article includes an internal power source or the external power source is already connected and the method 900 may begin at step 904.

In step 904, the article is inserted into an ear canal. A resin within the article may be uncured (e.g., a photocurable resin) and contained within a flexible sleeve, which is conformable to the ear canal upon insertion. When inserted, the proximal end portion of the article may align with the aperture, or opening, of the ear canal when a full insertion depth has been obtained. In some embodiments, the article is inserted into the ear canal of the wearer by a practitioner or by the wearer.

In step 906, a light source disposed within the flexible sleeve may be activated. The activated light source may facilitate curing the photocurable resin while the article remains inserted in the ear canal. A cured resin may be formed defining a cured shape that conforms to the ear canal.

In some embodiments, the light source is activated by the practitioner, by the wearer, or by a person remotely. Activation may also be based on calculated or predetermined conditions, such as upon detecting a desired sound metric or upon determining that a goal has been achieved.

The light source may optionally be driven at one or more stages. For example, in step 908, electrical power is applied to the light source at a first power level for a first time interval. In step 910, electrical power is applied to the light source at a second power level for a second time interval after the first time interval.

Power level may be represented by current when the voltage is fixed. For example, the forward voltage of the LED may be about 3.4 volts.

The second power level may be greater than or less than the first power level. In some embodiments, the second power level is greater than the first power level by about 2 times, about 3 times, about 4 times, or about 5 times. In some embodiments, the first power level is represented by current between about 3 milliamps and about 5 milliamps. In some embodiments, the first power level is represented by current at about 4 milliamps. In some embodiments, the first power level is represented by current less than about 4 milliamps.

Each time interval may be the same or different. In some embodiments, the second time interval is greater than the first time interval by about 1.5 times, about 2 times, about 2.5 times, or about 3 times. In some embodiments, each time interval is about 5 minutes or less. In some embodiments, each time interval is powered for about 2 minutes or less. In some embodiments, the first time interval is about 30 seconds. In one or more embodiments, the second time interval is about 90 seconds.

The method 900 may end with optional step 912, in which the power source is disconnected from the light source.

Thus, embodiments of the ARTICLE WITH INTERNAL LIGHT SOURCE FOR FITTING IN-SITU AND RELATED DEVICES AND METHODS are disclosed. Although reference is made to the accompanying set of drawings that form a part hereof and in which are shown by way of illustration several specific embodiments, it is to be understood that other embodiments are contemplated and may be made without departing from (e.g., still falling within) the scope or spirit of the present disclosure. The detailed description, therefore, is not to be taken in a limiting sense.

All references and publications cited herein are expressly incorporated herein by reference in their entirety into this disclosure, except to the extent they may directly contradict this disclosure.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "fixed," "coupled," or "connected" refer to elements being attached to each other either directly (in direct contact with each other) or indirectly (having one or more elements between and attaching the two elements).

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The phrases "at least one of," "comprises at least one of," and "one or more of" followed by a list refers to any one of the items in the list and any combination of two or more items in the list.

What is claimed is:

1. An article comprising:
   a flexible sleeve;
   a housing assembly fixed to the flexible sleeve, a distal portion of the housing assembly being surrounded by the flexible sleeve;
   a light source disposed within the flexible sleeve; and
   a photocurable resin contained within the flexible sleeve.

2. The article of claim 1, wherein the viscosity of the photocurable resin is in a range from 10 to 10,000 millipascal-seconds.

3. The article of claim 1, wherein the housing assembly is configured to elongate along a longitudinal axis in response to a transversely directed force on the flexible sleeve.

4. The article of claim 1, wherein the housing assembly comprises a proximal portion, the distal portion of the housing assembly being movable along a longitudinal axis relative to the proximal portion.

5. The article of claim 4, wherein the proximal portion of the housing assembly is fixed to a proximal end portion of the flexible sleeve and the distal portion of the housing assembly is fixed to a distal end portion of the flexible sleeve, the proximal portion extending through an opening in the distal end portion of the flexible sleeve.

6. The article of claim 4, wherein the housing assembly defines a cavity between the proximal and distal portions of the housing assembly when the housing assembly is elongated along the longitudinal axis, the cavity being in fluid communication with the photocurable resin contained within the flexible sleeve.

7. The article of claim 1, wherein the light source is disposed on the housing assembly.

8. The article of claim 4, further comprising a transducer disposed within the distal portion of the housing assembly, a cavity defined in the proximal portion of the housing assembly, and a connector electrically connected to the transducer via the cavity.

9. The article of claim 1, wherein the flexible sleeve is elastomeric.

10. The article of claim 1, wherein the light source comprises four solid-state devices spaced at 90 degree angles around the housing assembly.

11. An article comprising:
a flexible sleeve;
a housing assembly fixed to the flexible sleeve, a distal portion of the housing assembly being surrounded by the flexible sleeve;
a light source disposed within the flexible sleeve;
a cured resin contained within the flexible sleeve; and
a transducer disposed in the distal portion of the housing assembly.

12. The article of claim 11, wherein the cured resin is not adhered to the flexible sleeve.

13. The article of claim 11, further comprising an acoustic port defined by the distal portion of the housing assembly and a distal end portion of the flexible sleeve.

14. The article of claim 13, further comprising a wax bridge, the acoustic port at least partially extending between the wax bridge and the transducer.

15. The article of claim 11, wherein the cured resin is transparent to ultraviolet light, visible light, or both.

16. The article of claim 11, wherein the flexible sleeve defines two or more lobes and one or more air channels between the lobes exterior to the flexible sleeve, the air channels extending between a proximal end portion and a distal end portion of the flexible sleeve.

17. The article of claim 11, further comprising a power source releasably connected to a proximal portion of the housing assembly, the power source being electrically connected to at least one of the transducer and the light source.

18. A method comprising:
inserting an article into an ear canal, the article having a photocurable resin contained within a flexible sleeve conformable to the ear canal upon insertion; and
activating a light source disposed within the flexible sleeve to cure the photocurable resin while inserted in the ear canal to form a cured resin defining a cured shape that conforms to the ear canal.

19. The method of claim 18, further comprising: connecting an external power source to the light source before activating the light source; and disconnecting the external power source from the light source after activating the light source.

20. The method of claim 18, wherein the activating comprises:
driving the light source at a first power level for a first time interval; and
driving the light source at a second power level greater than the first power level for a second time interval after the first time interval.

* * * * *